US006883161B1

(12) United States Patent
Chovin et al.

(10) Patent No.: US 6,883,161 B1
(45) Date of Patent: Apr. 19, 2005

(54) UNIVERSAL GRAPH COMPILATION TOOL

(75) Inventors: André Chovin, Allex (FR); Alain Chatenay, Marly le Roi (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/764,986

(22) PCT Filed: May 16, 2000

(86) PCT No.: PCT/FR00/01308

§ 371 (c)(1),
(2), (4) Date: Jan. 22, 2001

(87) PCT Pub. No.: WO00/72111

PCT Pub. Date: Nov. 30, 2000

(30) Foreign Application Priority Data

May 21, 1999 (FR) .............................. 99 06511

(51) Int. Cl.[7] .............................. G06F 9/44; G06F 3/00; G06F 9/00; G06F 17/44
(52) U.S. Cl. ..................... 717/109; 717/113; 715/763; 715/740
(58) Field of Search ................................ 345/762, 763, 345/967; 717/109, 105, 113; 715/503, 740; 700/18, 17

(56) References Cited

U.S. PATENT DOCUMENTS

| 4,831,580 | A | * | 5/1989 | Yamada .................... 717/105 |
| 5,040,131 | A | * | 8/1991 | Torres ........................ 345/810 |
| 5,255,363 | A | * | 10/1993 | Seyler ........................ 715/526 |
| 5,587,660 | A | | 12/1996 | Chabbert et al. |
| 5,608,325 | A | | 3/1997 | Chabbert et al. |
| 5,625,823 | A | * | 4/1997 | Debenedictis et al. ...... 717/139 |
| 5,644,209 | A | | 7/1997 | Chabbert et al. |
| 6,178,551 | B1 | * | 1/2001 | Sana et al. ................... 717/140 |
| 6,243,858 | B1 | * | 6/2001 | Mizoguchi et al. ......... 717/107 |
| 6,286,017 | B1 | * | 9/2001 | Egilsson ..................... 715/503 |

OTHER PUBLICATIONS

Aho, Alfred. Sethi, Ravi. Ullman, Jeffrey. "Compilers, Principles, Techniques, and Tools." Chapter 1, pp. 1–24. Addison–Wesley. 1998.*

* cited by examiner

Primary Examiner—John Cabeca
Assistant Examiner—Blaine Basom
(74) Attorney, Agent, or Firm—Oblon, Spivak, McClelland, Maier & Neustadt, P.C.

(57) ABSTRACT

A universal graph compilation tool. The tool is implemented on a microcomputer, and includes a spreadsheet associated with a library of graphical symbols and a compiler. Compiled code is transmitted via the operating system of the microcomputer to its output port to which are connected programmable memories of the components which must be controlled by the commands generated on the basis of graphs produced on the spreadsheet.

8 Claims, 4 Drawing Sheets

UNIVERSAL GRAPH COMPILATION TOOL

BACKGROUND OF THE INVENTION

The present invention relates to a universal graph compilation tool.

DISCUSSION OF THE BACKGROUND

Increasingly more often, the design and programming of software products are represented directly by a presentation in the form of a graph connecting functions. For example, the "SAO" language used by the European aeronautical constructors makes it possible to represent any control algorithm as an oriented system of block diagrams. The IEC 1131-3 standard defines three graphic languages of the same nature: "SFC" ("Sequential Flow Chart"), "LD" ("Ladder Diagram") and "FBD" ("Function Block Diagram") which make it possible to represent any automation program graphically.

All of these known graphical representations must be acquired by data processing means, analyzed from the syntactic and semantic points of view, translated into a computer language (C, ADA, Assembler, Basic, Fortran, . . . ) which itself is compiled and edited in order to provide a binary program which can be executed by a processor or directly translated into a binary program which can be executed directly in a processor. The execution of this binary program makes it possible to implement the algorithms described in the initial graphical representation. The tools which ensure the entry, analysis and translation of the graphical representations will be referred to hereafter as graph compilers.

The known graph compilers however have the following disadvantages:
- the entry of graphs necessitates the programming of a graphical man-machine interface which is often expensive, complex, difficult to transfer from one computer system to another and sometimes not very ergonomic as they require very precise fingering in order to interconnect the various components of the graph.
- the syntactic and semantic analysis of the graphs is individual to each type of graphical representation and to each associated semantics,
- the generation or translation of the graphical representations into computer language is very specific to the language and optimizations of generation.

SUMMARY OF THE INVENTION

The present invention relates to a graph compiler which is universal, can be parameterized, whose processes of analysis, generation and optimization are independent of the syntax of the initial graph, of the semantics and of the final language into which the graph is translated. Furthermore, this compiler must have a graph entry phase which is simple and fast.

The graph compiler according to the invention comprises a man-machine interface implemented on a microcomputer where it is connected to a compiler which is itself connected via the operating system of the microcomputer to means of writing in at least one memory of at least one component on which the command corresponding to the graph must be used, the man-machine interface comprising a spreadsheet associated with a library of two types of graphical symbols each one corresponding, with regard to the first type, to an elementary component function and, with regard to the second type, to a link relating to the symbols of the first type, the symbols selected in the library being placed in the spreadsheet at the rate of one symbol per cell or per group of cells and assembled in such a way as to constitute a graph.

Advantageously, the graphical symbols are each contained in one or more squares, and their inputs and outputs all end at the centers of the corresponding sides of these squares.

BRIEF DESCRIPTION OF THE DRAWINGS

The present invention will be better understood on reading the detailed description of one embodiment, taken by way of non-limiting example and illustrated by the accompanying drawings in which.

DESCRIPTION OF THE PREFERRED EMBODIMENTS

The components to which the invention applies are, in particular, automatic devices.

In this case the expression "automatic devices" refers to "intelligent" automation devices, that is to say devices at least provided with means allowing them to communicate with a microcomputer via a communications line, at least in one direction, in order to receive from it commands and/or data and/or in order to transmit to it data (such as measured physical values if it is a matter of sensors, or positions if it is a matter of moving components, or states if it is a matter of switches, for example). Advantageously, these components comprise a memory in which can be stored data relating to their characteristics or their operation and generated by the compiler of the invention. Examples of such components are actuators, sensors, servo-valves, relays, programmable automatic devices, . . . or even remote input/output devices, that is to say assemblies separate from the microcomputer and the automation components, comprising at least an analog/digital converter and/or a digital/analog converter, and a multiplexer and/or a demultiplexer, or even programmable automatic devices which comprise the same functions as the remote input/output assemblies whilst additionally being able to execute automation sequences by themselves.

Figure 1:
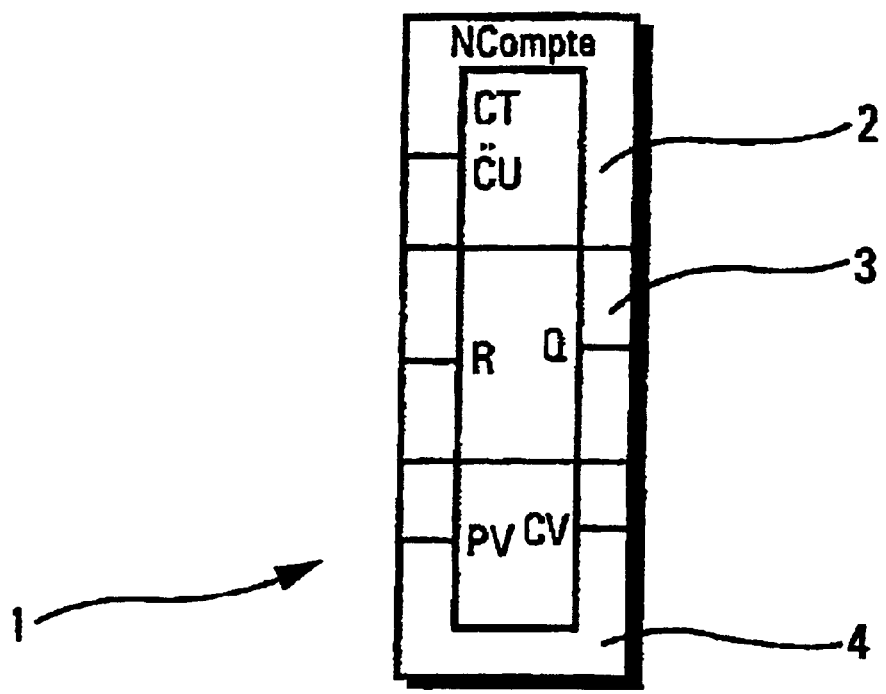
FIG. 1 is an example component able to be used by the invention and consisting of three elementary squares

FIG. 1 shows an example component 1 (a counter in this case) produced from three elementary squares referenced 2 to 4, aligned vertically, in order to obtain a graphic similar to the one generally used for graphs. In order to be able to establish links easily between this component and other components, the invention makes provision for all the inputs and outputs (a maximum of four in total) of the components to be located at the centers of the sides of the elementary squares which form them, as is the case in the example of FIG. 1.

Figure 2:
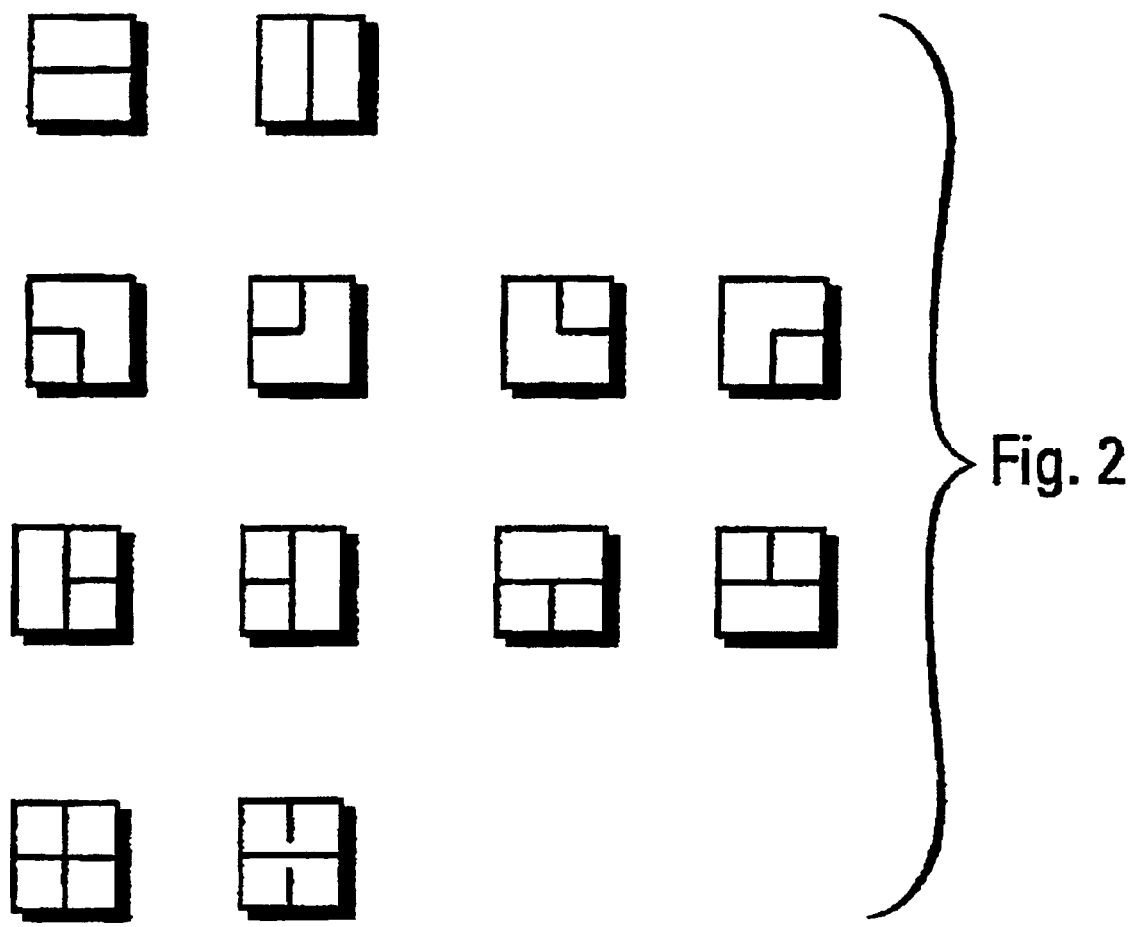
FIG. 2 is a set of examples of link symbols such as used by the invention.

FIG. 2 shows several examples of connection portions, each one disposed in an elementary square. In the same way as for the components, the ends of the connection portions end each time in the centers of the corresponding sides of the elementary squares.

The first line of FIG. 2 shows straight connections, namely a horizontal connection portion and a vertical connection portion.

The second line of FIG. 2 shows four connections, each one facing a different corner of the elementary square.

The third line of FIG. 2 shows four branch connections ("T" connections) in four different orientations.

Finally, the fourth line shows a perpendicular intersection of two conductor portions in mutual contact and another perpendicular intersection but without contact between the conductors.

Figure 3:
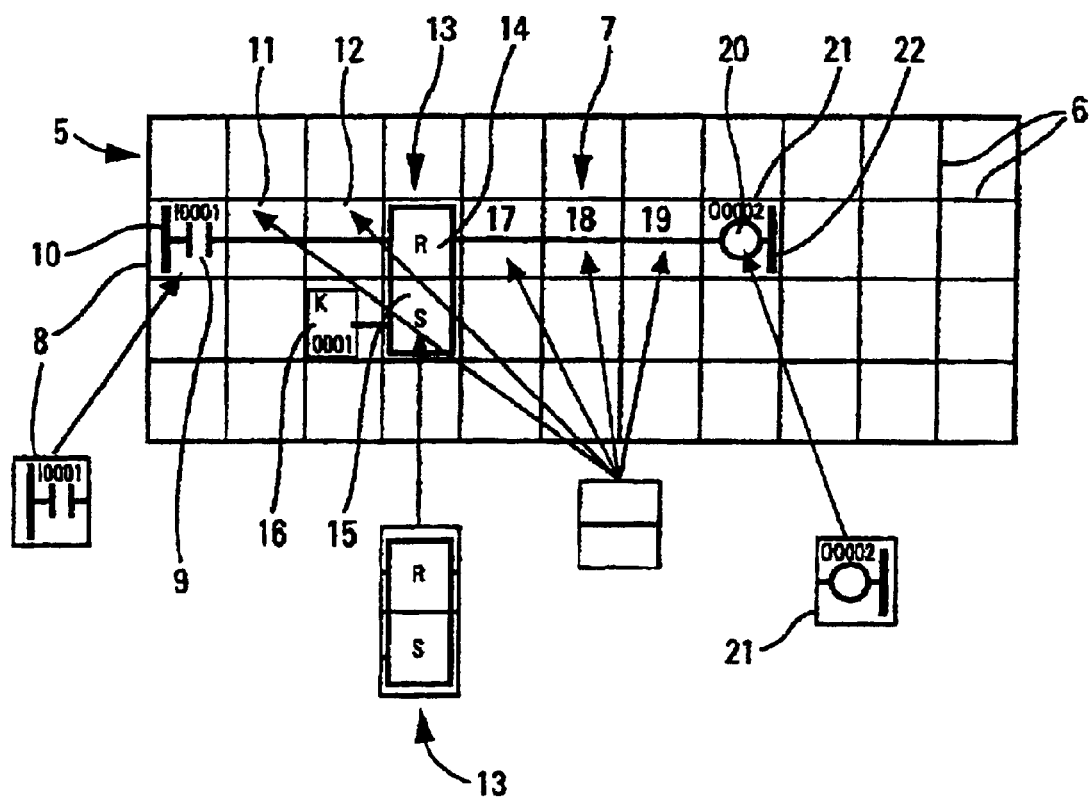
FIG. 3 is a simplified example of a graph according to the invention.

FIG. 3 shows a section 5 of a spreadsheet such as seen on the screen of a microcomputer. In this section 5 there has been shown a grid 6 in which each elementary square (or rectangle) corresponds to a cell of the spreadsheet. In this grid, there have been disposed the components of a portion of circuit 7 whose graphics conform with the standard used in the technical field relating to the circuit in question. These components are each constituted by one or more elementary symbols, each of these symbols being contained in an elementary square, as shown in FIGS. 1 and 2. These symbols are stored in a library (see FIG. 4) from which they are extracted as they are placed on the grid 6, this being done in a known way.

The portion of circuit 7 comprises, for the example shown, from left to right in the drawing, a first symbol 8 of a relay 9 ending at a potential bar 10. This relay 9 is, for example, numbered "0001", because it is assumed that the complete circuit comprises a large number of such relays. To the right of the symbol 8 there are disposed, on the same line of the grid, two horizontal junction symbols 11, 12 ending at the R input of a flip-flop 13 of the RS type. This flip-flop 13 comprises two elementary squares 14, 15, the square 15 (S input) being disposed under the square 14 (R input). The S input of the flip-flop 13 is connected to the output of a device, referenced "K0001" forcing this input to a defined value (logic "0" or "1"), this device consisting of a single elementary square 16, disposed just to the left of the square 15. The output of the flip-flop 13, located opposite its R input is connected by a horizontal link, composed of three symbols identical to those of the square 11 and 12 and occupying the squares 17, 18 and 19. This link ends at a component 20 (which is for example a voltage source referenced "00002"), shown in a square 21, inside of which it is connected to a potential bar 22.

The example shown in FIG. 3 of course has only a didactic purpose and is only partial. It will be noted that the elements of the graphics of FIG. 3 follow the same rules of displacement as all of the elements (in particular graphical ones) which are generally placed in the cells of a spreadsheet, that is to say that they can be translated horizontally and vertically, but cannot in any case pivot.

Figure 4:
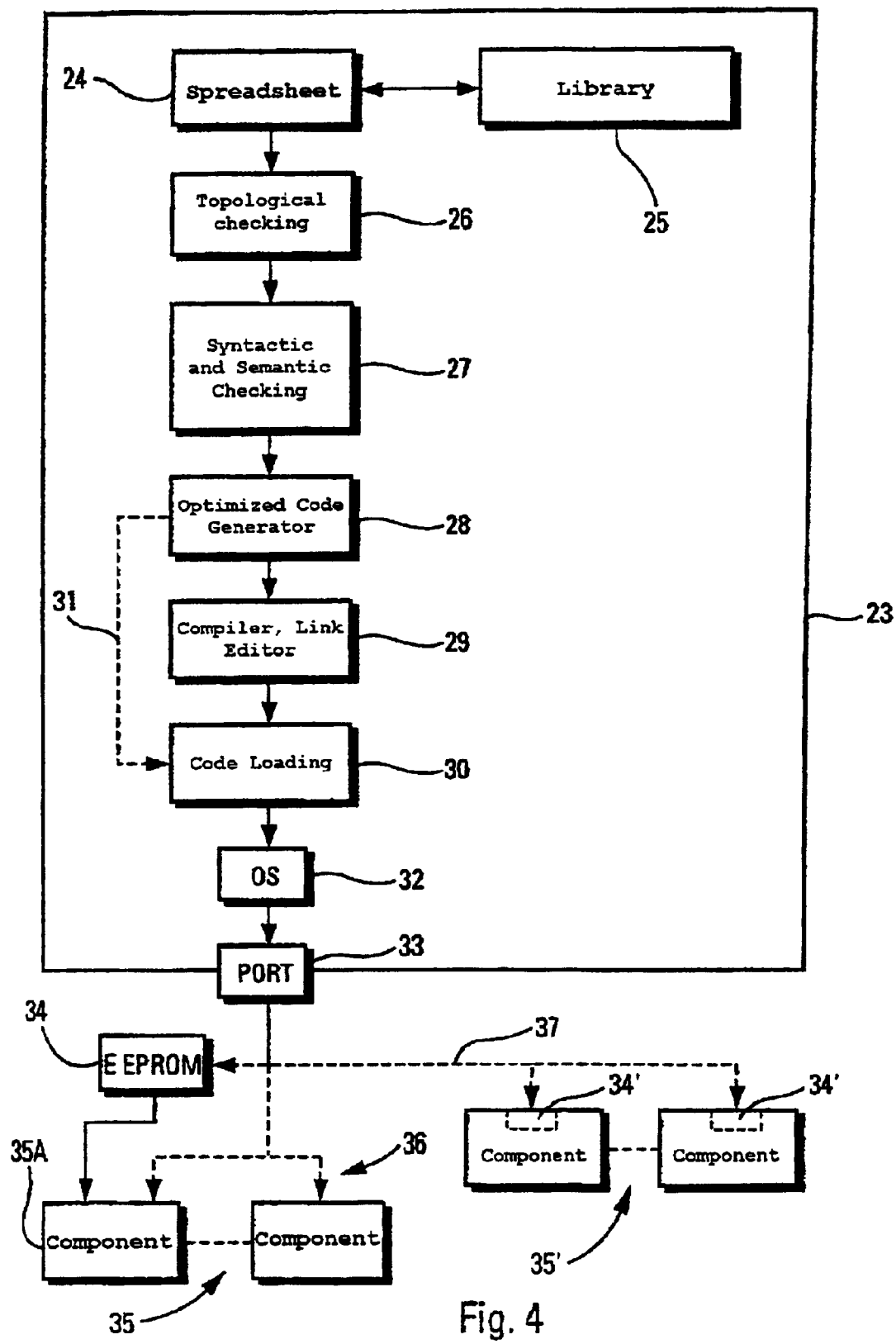
FIG. 4 is a block diagram of a graph compiler according to the invention.

FIG. 4 shows the functional block diagram of the graph compiler tool of the invention. This compiler comprises, in a microcomputer 23, a spreadsheet 24. This spreadsheet is connected to a library 25 in which are stored all the symbols necessary for the production of all the graphs which are required to be plotted. Not only are the graphical symbols stored there, but also the corresponding generated codes with sections which can be parameterized (codes which make it possible to carry out all of the processings which can be envisaged on the basis of the graphs). These symbols are allocated with references which appear, for example, in a window of the screen of the microcomputer as soon as the user wishes to use symbols and clicks on the icon of the library. He scrolls the list of these references and, as soon as he finds the one sought, he clicks on it and the corresponding symbol is displayed in the window of the spreadsheet. All that remains is to move the symbol thus displayed (for example by means of a mouse, using the well known "drag-and-drop" technique) to the desired cell of the spreadsheet.

When the graph of the circuit constituted in this way (or at least a portion of this circuit) is completed, a topological network checker 26 checks that the topological rules of the graphs have been complied with by the graph displayed in the spreadsheet 24. This first check of consistency of the graph entered by the user makes it possible to indicate to him for correction:

any elementary square occupied by a component or a connection which is not part of the dictionary of components and connections corresponding to the type of graph entered;

any elementary square in which two or more components or connection portions are superimposed;

any connection of an elementary square which would not be aligned with a connection of the adjacent elementary square.

This check and this representation are universal for any graph or network drawn in a plane. For a network or graph drawn in space, this representation and all the subsequent processings are extensible to a construction of components using elementary cubes or any elementary regular volume making it possible to fill the entire space by adjacency (for example trihedrals with equilateral faces, . . . ). The connections are then placed at the centers of the faces of the volume.

After this first check, a checker 27 checks, using codes coming from the library 25 and corresponding to the various components of the graph produced, that the syntactic and semantic rules of graphs have been complied with by the graph displayed in the spreadsheet 24. These codes relate to:

specific parameters of the components, for example their position and their name in the entered graph, the values of certain constants (for example, the duration of a timing delay), . . .

the list, which can be parameterized, of computer language instructions to be generated during the ultimate translation phase. These instructions have alphanumeric strings modifiable according to the said parameters and information passing though the points of connection of the component.

the semantic characterization of the data of each connection point of the component: input or output for an oriented graph, or neutral for a non-oriented graph; type of information passing though the connection (Boolean, digital with absolute precision, digital with relative precision, character string, table, automatic device status, . . . )

When these checks are completed and possible errors have been corrected, a generator 28 generates an optimized code. Steps 26 to 28 constitute the equivalent of a known proprietary programming tool. They are implemented by means of programs which are easy to produce by those skilled in the art on reading this description.

The code, which is optimized in 28, is sent to a compiler and link editor 29. The compiled code is loaded at 30 in order to produce an executable control program. According to a variant, as represented by an arrow 31 drawn in dashed line, the code optimized in 28 is directly loaded at 30. The control program is transmitted by means of the operating system 32 of the microcomputer 23 to its output port 33 (serial, parallel, bus . . . ).

It is possible to connect to the port 33 of the microcomputer 23 a programmable memory 34 (for example of the EEPROM type) fixed on an appropriate support, and to transmit to it the corresponding executable program available at 30.

When the programming of the memory 34 is completed, the latter is removed from its support and inserted in the corresponding automation component (35A) forming part of the assembly of components to be programmed (35). This operation is repeated for the programmable memories of all the other automation components. The microcomputer 23 can of course advantageously control and supervise the components of the assembly 35, as indicated by the arrows 36 drawn in dashed line.

According to a variant of the invention, shown in dashed line, the programmable memories (34') are fixed to the automation components (35') which are connected to the port 33 by a link 37 (which can be similar to the link 36), and the programming of these memories is carried out via this link 37.

What is claimed is:

1. A universal graph compilation system comprising:
   at least one component, each component including memory and configured to receive at least one of data or commands; and
   a microcomputer configured to be connected to the respective memories of the at least one component and including,
   an operating system,
   a compiler,
   means for writing to the respective memory of each of said at least one components, the means for writing being in communication with the compiler via the operating system, and
   a man-machine interface in communication with the compiler and configured to generate a graph, the man-machine interface including,
   a spreadsheet comprising a plurality of cells, the spreadsheet associated with a library of (i) graphical symbols of at least two graphic languages including symbols representing an elementary component function and symbols representing links relating the elementary component function symbols and (ii) codes which correspond with the graphical symbols of said at least two graphic languages, and
   a syntactic and semantic checker configured to use the codes corresponding to the graphical symbols to check whether the syntactic and semantic rules of the generated graph have been complied with;
   wherein (a) to generate the graph, the graphical symbols are selected from the library and placed on the spreadsheet, (b) each of the graphical symbols is represented on the spreadsheet in at least one elementary square which corresponds to a cell of the plurality of cells of the spreadsheet, and (c) a connection of the graphical symbol represented in the elementary square ends at the center of one of the four sides of the elementary square.

2. The system as claimed in claim 1, wherein the respective memories of the at least one component are physically portable and configured to be connected directly to the microcomputer.

3. The system as claimed in claim 1, wherein the respective memories of the at least one component are affixed to the respective component and said data and/or commands are remote loaded.

4. The system as claimed in claim 1, wherein the man-machine interface comprises a topological checker.

5. The system as claimed in claim 1, wherein the library codes relate to a specific parameter of the elementary component function.

6. The system as claimed in claim 1, wherein the library codes relate to a semantic characterization of each connection point of the elementary component function.

7. The system as claimed in claim 1, wherein the microcomputer further comprises a code generator.

8. The system as claimed in claim 7, wherein the library codes relate to parameterized computer code to be generated by the code generator.

* * * * *